United States Patent
Minnen et al.

(10) Patent No.: US 12,464,139 B2
(45) Date of Patent: Nov. 4, 2025

(54) VIDEO INTER/INTRA COMPRESSION USING MIXTURE OF EXPERTS

(71) Applicant: Google LLC, Mountain View, CA (US)

(72) Inventors: David Charles Minnen, Mountain View, CA (US); Sung Jin Hwang, Mountain View, CA (US); Elliott Michael Karpilovsky, Santa Clara, CA (US); Debargha Mukherjee, Cupertino, CA (US)

(73) Assignee: Google LLC, Mountain View, CA (US)

( * ) Notice: Subject to any disclaimer, the term of this patent is extended or adjusted under 35 U.S.C. 154(b) by 69 days.

(21) Appl. No.: 18/286,574

(22) PCT Filed: May 7, 2021

(86) PCT No.: PCT/US2021/031218
§ 371 (c)(1),
(2) Date: Oct. 12, 2023

(87) PCT Pub. No.: WO2022/235270
PCT Pub. Date: Nov. 10, 2022

(65) Prior Publication Data
US 2024/0195985 A1    Jun. 13, 2024

(51) Int. Cl.
*H04N 19/176* (2014.01)
*H04N 19/119* (2014.01)
*H04N 19/159* (2014.01)

(52) U.S. Cl.
CPC ......... *H04N 19/176* (2014.11); *H04N 19/119* (2014.11); *H04N 19/159* (2014.11)

(58) Field of Classification Search
CPC ... H04N 19/176; H04N 19/119; H04N 19/159
USPC ...................................... 375/240.12
See application file for complete search history.

(56) References Cited

U.S. PATENT DOCUMENTS 12,309,389 B2 *  5/2025  Rosewarne ..........  H04N 19/176
2020/0236349 A1   7/2020  Jiefu et al.

FOREIGN PATENT DOCUMENTS

WO    WO-2019185883 A1 * 10/2019 ............. H04N 19/12

OTHER PUBLICATIONS

Chen et al., "Learning for Video Compression," CoRR, Submitted on Jan. 9, 2019, arXiv:1804.09869v2, pp. 1-11.

(Continued)

*Primary Examiner* — Dominic D Saltarelli
(74) *Attorney, Agent, or Firm* — Fish & Richardson P.C.

(57) ABSTRACT

Methods, systems, and apparatus, including computer programs, for compression and decompression of video data using an ensemble of machine learning models. Methods can include defining for each frame in a video, a plurality of blocks in the frame. Methods can further include processing the frames of video in sequential sets, wherein each sequential set is at least a current frame (220) of video and a prior frame (240) of video in the ordered sequence. Each respective prediction of a block in the frame of the video includes providing, as input to a prediction model a first and the second border (235,230) of a current block (225) of the current frame, a first and a second border (250, 255) for a respective current block (245) of the prior frame and the respective current block (245) of the prior frame.

20 Claims, 3 Drawing Sheets

(56) References Cited

OTHER PUBLICATIONS

International Preliminary Report on Patentability in International Appln. No. PCT/US2021/031218, mailed on Nov. 16, 2023, 8 pages.
International Search Report and Written Opinion in International Appln. No. PCT/US2021/031218, mailed on Feb. 14, 2022, 16 pages.
Office Action in European Appln. 21728747.3, mailed on Jan. 30, 2025, 8 pages.
Wang et al., "A Modular Neural Network Vector Predictor For Predictive Image Coding," IEEE Transactions on Image Processing, Aug. 1998, 7(8):1198-1217.

* cited by examiner

VIDEO INTER/INTRA COMPRESSION USING MIXTURE OF EXPERTS

CROSS-REFERENCE TO RELATED APPLICATION

This application is a National Stage Application under 35 U.S.C. § 371 and claims the benefit of International Application No. PCT/US2021/031218, filed May 7, 2021, the disclosure of which is hereby incorporated herein by reference.

BACKGROUND

This specification relates to video data compression.

Compressing data involved determining a representation of the data that occupies less space in a memory and/or requires less bandwidth for transmission, e.g., over a network. Compressed data may be stored (e.g., in a logical data storage area or physical data storage device), transmitted to a destination over a communications network (e.g., the Internet), or used in any other manner. Generally, the data can be reconstructed (either approximately or exactly) from the compressed representation of the data.

SUMMARY

This specification describes performing data compression and data decompression using multiple models that each can be selected during portions of a compression or decompression sequence.

In general, one innovative aspect of the subject matter described in this specification can be embodied in methods performed by a data processing apparatus, comprising: for each frame in a video that includes multiple frames in an order sequence, defining, in the frame, a plurality of blocks in the frame, where each block in the frame is a sub-portion of the frame; processing the frames of video in sequential sets, wherein each sequential set is at least a current frame of video and a prior frame of video in the ordered sequence; for each sequential set, predicting blocks in the current frame of the video, each respective prediction of a block in the frame of the video comprising providing, as input to a prediction model: a first border of a current block of the current frame of the video; a second border of a current block of the current frame of the video; a first border for a respective current block of the prior frame of the video; a second border for the respective current block of the prior frame of the video; the respective current block of the prior frame of the video; and predicting, by the prediction model and based on the input to the prediction model for the sequential set, at least a sub-portion of the current block of the current frame of video.

Other embodiments of this aspect include corresponding systems, apparatus, and computer programs, configured to perform the actions of the methods, encoded on computer storage devices.

In some aspects, the prediction model comprises a mixture of experts (MOE) model that includes a plurality of prediction models; each sequential set is associated with a respective identifier specifying one of the plurality of prediction models; and the prediction model used to predict the current block of the current frame of video is selected based on the identifier included in the sequential set.

In some aspects the MOE model comprises neural network models.

In some aspects, the input to the prediction model comprises pixel values that are flattened and concatenated.

In some aspects, the MOE model includes convolutional neural network layers; and further comprising, providing, as input to the prediction model, the respective current block of the prior frame of the video as a current block of the current frame of video as a basis for predicting the current block of the current frame of video.

In some aspects, each first border and second border for a respective block defines a contiguous border.

In some aspects, predicting, by the prediction model and based on the input to the prediction model for the sequential set, at least a sub-portion of the current block of the current frame of video comprises predicting the entire current block of the current frame of video.

In some aspects, predicting, by the prediction model and based on the input to the prediction model for the sequential set, at least a sub-portion of the current block of the current frame of video comprises an auto-regressive prediction of only the sub-portion of the current block.

Particular embodiments of the subject matter described in this specification can be implemented so as to realize one or more of the following advantages. In learning-based video compression that includes image (frame) compression, image codecs are developed by optimizing a computational model to minimize a rate-distortion objective. The systems and methods described below realize two enhancements, using inter and intra prediction methods such that adjacent borders (e.g., top and left borders) are used for compression/decompression and using multiple machine learning models that lead to network architectures with better rate-distortion performance than existing models. These enhancements also reduce serial processing.

In some implementations, the systems and methods use neural networks within a mixture-of-experts (MoE) framework to learn to combine information from a previous frame and from previous blocks in the current frame to form a learned inter/intra-predictor. These learned methods outperform hand-engineered predictors in many cases, and also provide a net rate-distortion benefit to a video codec. The MoE is, in some implementations, designed to keep each individual neural network smaller and faster that a neural network that is trained to handle all sequences. In this approach, multiple networks are learned in parallel and then only one is selected for use. Then, during compression, the encoder will decide which expert to use (if any), signal the decision by adding the index to the data (e.g., a bitstream), which, in turn, is used by a corresponding decoder to select the same expert for that portion of data. This reduces overall training time and complexity.

In general, video compression and decompression techniques can include either inter-prediction mode or intra-prediction mode for encoding or decoding pixel values of a current block of a frame. In contrast, according to the techniques presented in this document, both inter-prediction mode and intra-prediction mode can be simultaneously used can reduce reconstruction loss by predicting the pixel values based on spatial (intra) and temporal (inter) context.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes techniques and methods of video compression and decompression.

In general, video data is raw data that can be obtained from a source such as a video camera, a video archive containing previously captured raw video, and/or a video feed interface to receive video from a video content provider. As a further alternative, video source may generate computer graphics-based data as the source video, or a combination of live video, archived video, and computer-generated video.

The video data includes multiple frames (also referred to as images) in sequence. For example, a video data corresponding to a video clip of duration 10 seconds at the rate of 25 frames per second (FPS) will include 10*25=250 frames in sequence. Each frame of the video data is further divided in blocks that usually include two or more pixels. For example, a "N×N" block can refer to the dimensions of a block in terms of vertical and horizontal pixel dimensions of each frame in the video data.

In general, video compression and decompression techniques can include an inter-prediction mode and intra-prediction mode for encoding or decoding pixel values of a current block of a frame. In the inter prediction mode, pixel values within a current block of a frame are predicted using information found in other frames as references. In the intra prediction mode, a pixel value within a current block of a frame is predicted using information found within the same frame.

This specification describes methods of techniques of video compression and decompression using a system of machine learning models that exploits both inter and intra prediction modes. For example, during compression, pixel values of a block in a current frame can be compressed based on the pixel values of the current frame and the pixel values of prior frames in the video data. Similarly, during decompression, pixel values of a block in a current frame can be decompressed based on the pixel values of the current frame and the pixel values of prior frames in the video data.

These features and additional features are described in more detail below.

Figure 1:
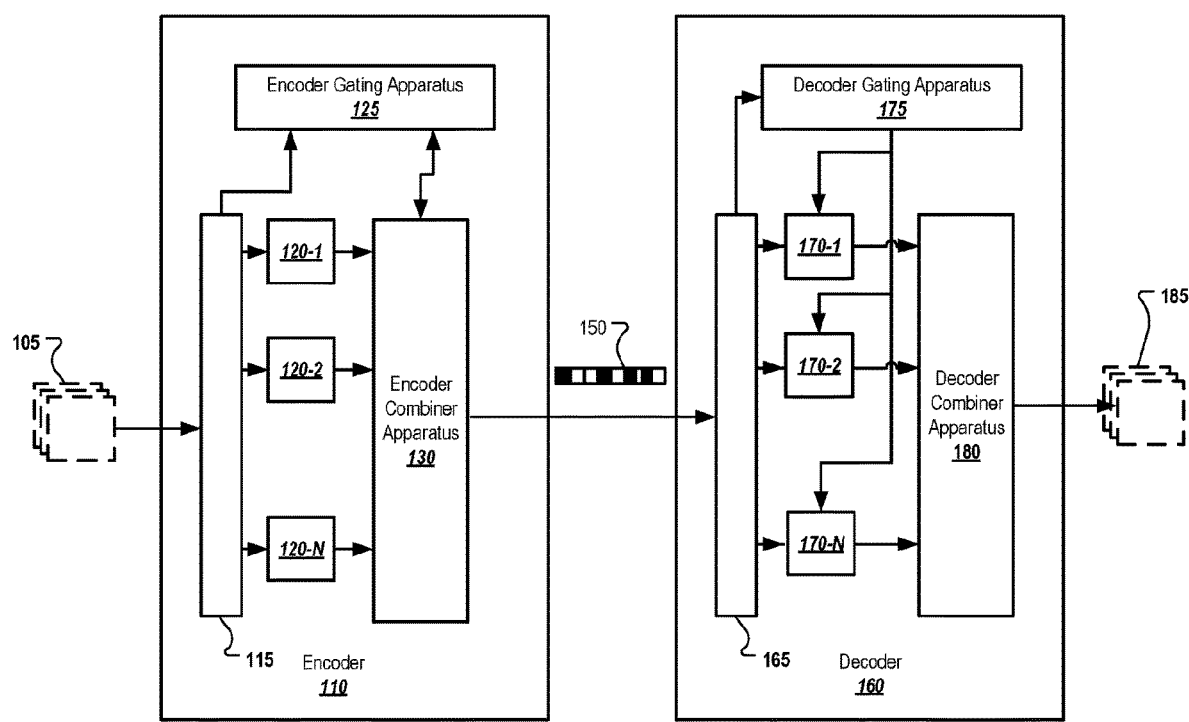
FIG. 1 is a block diagram of an example compression-decompression system.

FIG. 1 is a block diagram of an example system 100 that implements the compression system (referred to as an encoder 110) and a decompression system (referred to as a decoder 160). The system 100 is an example system implemented as computer programs on one or more computers in one or more locations in which the systems, components, and techniques described below are implemented.

The encoder 110 and decoder 160 may be co-located or remotely located, and the compressed data generated by the encoder can be provided to the decoder in any of a variety of ways. For example, the compressed data may be stored (e.g., in a physical data storage device or logical data storage area), and then subsequently retrieved from storage and provided to the decoder. As another example, the compressed data may be transmitted over a communications network (e.g., the Internet) to a destination, where it is subsequently retrieved and provided to the decoder for decompression and reconstruction of frames of the video data.

In some implementations, the encoder 110 and/or the decoder 160 can implement a mixture of experts (MOE) model. For example, the encoder 110 can include multiple encoder expert models (120-1 to 120-N) and an encoder gating apparatus 125. Similarly the decoder 160 can include multiple corresponding decoder expert models (170-1 to 170-N) and a decoder gating apparatus 175. Each expert model man encoder 110 (120-1 to 120-N) and the decoder 160 (170-1 to 170-N) can be a machine learning model trained to compress and decompress blocks of frames of the video data 105 respectively.

In some implementations, the multiple encoder expert models (120-1 to 120-N) and the multiple decoder expert models (170-1 to 170-N) can include neural network models. The neural networks used by the encoder 110 (also referred to herein as "encoder neural networks") can be jointly trained along with neural networks used by the decoder 160 (also referred to herein as "decoder neural networks") using an objective function that penalizes differences between the input to the encoder neural network and the output of the decoder neural network. An example of such an objective function is a rate distortion objective function, though it will be appreciated that other examples may alternatively be used. Generally, each neural network described in this specification can have any appropriate neural network architecture that enables it to perform its described function. For example, the neural networks can be convolutional neural networks (CNN) that can include multiple convolution layers and one or more pooling layers, each having a plurality of trainable parameters. In another example, the neural networks of the encoder 110 and the decoder 160 can be an autoencoder or a variational autoencoder.

Each model pair (i.e. an encoder model and a corresponding decoder model) may be jointly trained on a different set of training data to other model pairs in the mixture of experts model. Each set of training data may, for example, correspond to blocks of video with a different type of video content. In this way, each model pair can be trained to specialize in encoding/decoding a different kind of block/patch of video.

To facilitate compression of video data 105, the encoder 110 can include an encoder frame processing apparatus 115 that is configured to receive as input the sequence of frames of the video data 105. The encoder frame processing apparatus 115 processes each frame of the video data 105 and generates, for each frame, multiple blocks that make up each of those frames. In other words, each frame is divided into a plurality of blocks. For example, assume that a video data 105 includes frames of dimension 150×150 pixels and the encoder frame processing apparatus 115 defines blocks of dimension 10×10 pixels. In this example, the encoder frame processing apparatus 115 can define each frame of the video data using 15*15=225 blocks.

Since the frames of the video data 105 are in sequence, the encoder 105 is configured to sequentially compress the video data 105 on a frame-by-frame basis. For example, if the video data 105 includes 10 frames, the encoder 105 compresses the first frame, followed by the second frame and likewise the rest of the frames according to the sequence order. The encoder 105 can be further configured to process each frame on a block-by-block basis. This is further explained with reference to FIG. 2A.

Figure 2A:
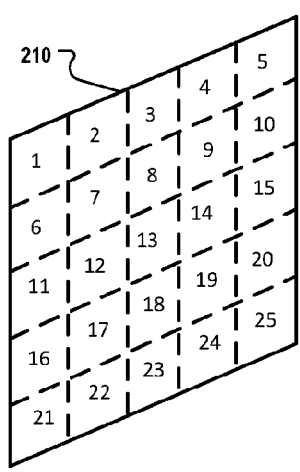
FIG. 2A is a block diagram of an example frame of a video.

FIG. 2A is a block diagram of an example frame of a video data. In this example, the frame 210 has a dimension of 100×100 pixels and includes 25 blocks of dimension 20×20 pixels. During compression, the encoder 110 compresses blocks of the first row (e.g., blocks 1-5) followed by the second row (e.g., blocks 6-10), until the last row of the blocks (e.g., blocks 21-25). For example, blocks 1 to 5 are compressed before blocks 6 to 10, and so on. While compressing the blocks of a particular row, the encoder 110 compresses the block in a sequence, e.g., from left to right. For example, while compressing the blocks 1 to 5, the encoder 110 compresses the blocks in order of the depicted indices, block 1, followed by block 2, etc. In this example, following such a heuristic for selecting and compressing blocks of a frame results in compressing blocks 1 to 25 according to the respective depicted indices.

In some implementations, while compressing a block of a frame (referred to as a current block of a current frame), the encoder frame processing apparatus 115 of the encoder 110 provides as input to each encoder expert model the pixel values of (i) a first border of the current block of the current frame, (ii) a second border of the current block of the current frame, (iii) a first border of a respective current block of a prior frame, (iv) a second border of the respective current block of the prior frame, and (v) the respective current block of the prior frame. This is further explained with reference to FIG. 2B.

Figure 2B:
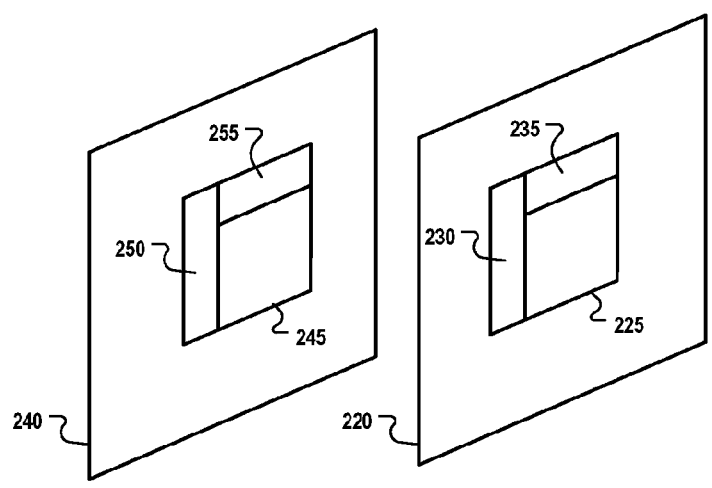
FIG. 2B is a block diagram of an example current frame and a prior frame of a video.

FIG. 2B is a block diagram of an example current frame and a prior frame. As seen in FIG. 2B, the current frame 220 includes a current block 225 (increased in size relative to the frame 220 for illustrative purposes) and the prior frame 240 includes a respective current block 245 (again, increased in size relative to the frame 240 for illustrative purposes). The respective current block of the prior frame is a block of the prior frame that has the same pixel position with respect to the prior frame as the current block with respect to the current frame, or simply the same block index for each frame. The current frame 220 further includes a first border 230 and a second border 235 of the current block 225. Similarly, the prior frame 240 includes a first border 250 and a second border 255 of the respective current block 245. In some implementations, these borders are adjacent borders, as shown in FIG. 2B. The dimensions of the first border and the second border of the current frame 220 and the prior frame 240 can depend on the particular implementation. For example, the first border and the second border of the current block 225 of the current frame 220 and the respective current block 245 of the prior frame 240 can be 4 pixels wide for the 20×20 pixel block.

Each border of a block may comprise a strip of pixels that run along the edge of that block. The pixels that form a border of a block may be taken from one or more blocks of the corresponding frame that are adjacent to said block. These one or more adjacent blocks may be blocks are decoded (or would be decoded) prior to the decoding of said block.

In the example shown, the first border 230 of the current block 225 is formed from pixels of a block to the left of the current block 225 and a block up and to the left of the current block 225, while the second border 235 of the current block 225 is formed from pixels of a block above the current block 225. The arrangement of the first border 250 and second border 255 of the respective current block 245 of the prior frame 240 have the same arrangement relative to the respective current block 245 of the prior frame 240. However, it will be appreciated that the borders of each block may be taken from other adjacent blocks, depending on the decoding order of the blocks.

In some implementations, the encoder frame processing apparatus 115 of the encoder 110 generates a more structured representation of the pixel values that is provided as input to the encoder expert models. For example, the encoder frame processing apparatus 115 can flatten the pixel values to generate (i) a first vector of pixel values of the first and second border of the respective current block of the prior frame, (ii) a second vector of pixel values of the respective current block of the prior frame, and (iii) a third vector of pixel values of the first and the second border of the current block of the current frame. The encoder frame processing apparatus 115 can further concatenate the first, second and the third vector to generate as output an vector of pixel values (referred to as an encoder input vector) that can be provided as input to the multiple encoder expert models (120-1 to 120-N).

In some implementations, if the multiple encoder expert models (120-1 to 120-N) are CNNs, the encoder frame processing apparatus 115 of the encoder 110 can generate images that can be provided as input to the multiple encoder expert models. These images can be based on the pixel values of the first border and the second of the current block of the current frame, a first border and the second border of a respective current block of a prior frame, and the respective current block of the prior frame. For example, the encoder frame processing apparatus 115 can generate a first image depicting the first border of a respective current block of a prior frame, the second border of a respective current block of a prior frame and the respective current block of the prior frame. The encoder frame processing apparatus 115 can also generate a second image depicting the first border of a respective current block of a current frame, the second border of a respective current block of a current frame and the respective current block of the prior frame.

In some implementations, each of the multiple encoder expert models 120-1 to 120-N can separately process the encoder input vector of pixel values to generate a respective compressed representation of the current block of the current frame. For example, the encoder expert model 120-1 can process the encoder input vector of pixel values to generate a compressed representation of the current block 225 of the current frame 220. Similarly the remaining encoder expert models 120-2 to 120-N can generate a respective compressed representation of the current block 225.

In some implementations, the encoder frame processing apparatus 115 can define sub-portion within the blocks of the frames. For example, a block of dimension 25×25 pixels can include 5 sub-portions of dimension 5×25 pixels. In such implementations, each of the multiple encoder expert model 120-1 to 120-N can iteratively compress each of the sub-portions of the current block of the current frame. It should be noted that during each iteration of the compression process of a sub-portion of a current block, the first border and the second border corresponding to the current blocks of the current frame and the prior frame can change based on the iteration and how the sub-portions are defined. For example, if the block of dimension 25×25 pixels includes 5 sub-portions of dimension 5×25 pixels and the border width is 5 pixels, the second border of the third sub-portion of the current block is the second sub-portion in both the current frame and the prior frame. Subsequently the first border of the third sub-portion of the current block has a dimension 10×5 pixels.

In some implementations, the encoder 110 can also include an encoder gating apparatus 125 that is configured to select a compressed representation of the current block of the current frame as a final compressed representation from among the N different compressed representations generated by each of the N encoder expert models. For example, the encoder gating apparatus 125 can be configured to receive as input the encoder input vector of pixel values and the N compressed representations. The encoder gating apparatus 125 can process the inputs and generate as output an identifier (or an index) indicating a particular encoder expert model such that the compressed representation generated by the particular encoder expert model can be selected as the final compressed representation.

In some implementations, the encoder 110 can further include a combiner apparatus 130 configured to facilitate combining of the final representation (i.e., the compressed representation of the current block) and that adds an identifier of the particular encoder expert model that is generated by the gating apparatus 125. For example, the combiner apparatus 125 can combine the final representation and the identifier of the particular encoder expert model by concatenation, to generate a bit stream 150 before transmitting the bit stream to the decoder 160.

To compress the entire video data 105, the encoder 110 iterates through the multiple blocks of the each frame in the sequence of frames of the video data 105 and processes each block to generate a final compressed representation of the blocks and transmits the final compressed representation and the corresponding identifier of the encoder expert model as a bit stream to the decoder 160. For example, if a video data 105 has 250 frames and each frame has 25 blocks, the encoder iterates 6250 times to compress 6250 blocks in the entire video data 105.

The decoder 160, after receiving the bit stream 150, can reconstruct the video data 105 by predicting the blocks of the sequence of frames of the video data 105. To predict the blocks of the frames, the decoder 160 can implements a MOE model that includes multiple decoder expert models (170-1 to 170-N). In some implementations, each of the decoder expert model can be trained and/or configured to process the compressed representations of a corresponding encoder expert model. For example, the decoder expert models 170-1 to 170-N are trained and/or configured to process the compressed representations from the encoder expert models 120-1 to 120-N respectively.

Since the frames of the video data 105 are in sequence, the decompression process of the blocks corresponding to the multiple frames of the video data 105 is also sequential (similar to the compression process of the blocks by the encoder 110). For example, at any instance of the decompression process when the current block of the current frame is being predicted by the decoder 160, the prior frame that includes multiple blocks has already been reconstructed by the decoder 160. Similar to the compression process performed by the encoder 110, the decoder 160 is configured to sequentially reconstruct the video data 105 on a frame-by-frame basis. The decoder 110 can be further configured to process each frame on a block-by-block basis.

In some implementation, the decoder 160 includes a decoder frame processing apparatus 165 that can be configured to process the bit stream received from the encoder 110. The decoder frame processing apparatus 165, after receiving the bit stream, can identify the final compressed representations of the blocks and the corresponding identifiers of the encoder expert model. For example, the bit stream transmitted by the encoder 110 can include the final compressed representations of the multiple blocks of the multiple frames of the video data 105 and the corresponding identifiers of the encoder expert models input by the encoder combiner 130. At any instance, while decompressing a current block of the current frame, the decoder frame processing apparatus 165 can identify the final compressed representation of current block of the current frame and the corresponding identifiers of the encoder expert models in the bit stream. The decoder frame processing apparatus 165 can be further configured to provide the corresponding identifiers of the encoder expert models as input to a decoder gating apparatus 175.

In some implementations, while decompressing the current block of the current frame, the decoder gating apparatus 175 can process the identifier of the encoder expert model to select a decoder expert model for predicting the current block. For example, if the identifier of the encoder expert model identifies that the third encoder expert model 120-3 was used by the encoder to compress the current block, the decoder gating apparatus 175 can select the third decoder expert model 170-3 to predict the current block of the current frame.

In some implementations, while decompressing a current block of a current frame the decoder frame processing apparatus 165 of the decoder 160 can be further configured to provide as input to the selected decoder expert model (identified by the decoder gating apparatus 175 using the identifier of the encoder expert model) the pixel values of (i) a first border of the current block of the current frame, (ii) a second border of the current block of the current frame, (iii) a first border of a respective current block of a prior frame, (iv) a second border of the respective current block of the prior frame, and (v) the respective current block of the prior frame.

Similar to the encoder input vector generated by the encoder frame processing apparatus 115 of the encoder 110, the decoder frame processing apparatus 165 can generate a more structured representation that can be provided as input to the selected decoder expert model. For example, the decoder frame processing apparatus 165 can flatten the pixel values to generate (i) a first vector of pixel values of the first and second border of the respective current block of the prior frame, (ii) a second vector of pixel values of the respective current block of the prior frame, and (iii) a third vector of pixel values of the first and the second border of the current block of the current frame. The decoder frame processing apparatus 110 can further concatenate the first, second and the third vector to generate as output a vector of pixel values (referred to as a decoder input vector) that can be provided as input to the selected decoder expert model.

In some implementations, the decoder frame processing apparatus 165 can also provide as input to the selected decoder expert model, the final compressed representation of the current block of the current frame obtained from the bit stream. In such implementations, the data processing apparatus 165 can concatenate a fourth vector to the decoder input vector where the fourth vector can include the final compressed representation of the current block of the current frame that was obtained from the bit stream.

In some implementations, the selected decoder expert model can process the decoder input vector of pixel values and optionally the final compressed representation of the current block to predict a current block of the current frame. For example, if the third decoder expert model 170-3 is selected by the decoder gating apparatus 175, the decoder expert model 170-3 can process the decoder input vector to predict the current block of the current frame.

If the encoder frame processing apparatus 115 of the encoder has defined sub-portion within the blocks of the frames, then each sub-portion of the current block of the current frame is decompressed separately by the decoder 160. For example, if a block of dimension 25×25 pixels includes 5 sub-portions of dimension 5×25 pixels, then each of the 5 sub-portions can be predicted by the corresponding decoder expert models.

In some implementations, the decoder 110 can further include a decoder combiner apparatus 130 configured to facilitate the combining of the predicted blocks into frames. For example, the decoder combiner apparatus 180 can reconstruct the current frame after predicting each of the multiple blocks of the current frame. The decoder combiner apparatus 180 can be further configured to reconstruct a video data 185 by combining the multiple frames. To reconstruct the entire video data 105, the decoder 160 iterates multiple times to predict multiple blocks of the each frame in the sequence of frames of the bit stream 150. For example, if a video data 105 has 250 frames and each frame has 25 blocks, the decoder 160 iterates 6250 times to predict 6250 blocks to reconstruct the 250 frames of the video data 105.

The neural networks of the encoder 110 and the decoder 160 can be jointly trained using machine learning training techniques (e.g., stochastic gradient descent) to optimize a rate-distortion objective function. The training process can use error metric such as mean squared error (MSE), mean absolute error (MAD), and multiscale structural similarity (MS-SSIM) or any differentiable loss function. The training process can also use adversarial loss (the adversary part of a GAN) or a perceptual metric (i.e., a learned metric) loss. More specifically, the multiple encoder expert models (120-1 to 120-N) and the multiple decoder expert models (170-1 to 170-N) can be jointly trained to optimize the rate distortion objective function. Each encoder expert model of an encoder 110 has a corresponding decoder expert model in the decoder 160. For example, the models (170-1 to 170-N) are the respective decoder expert models of the encoder expert models (120-1 to 120-N). During training, each pair of encoder-decoder expert model is trained on a set of training data jointly such that the decoder expert model is able to efficiently process and decompress the compressed representations generated by the encoder expert model.

In some implementations, the encoder 110 and the decoder 160 can be used in a setting where the compression of the video data 105 can be performed using techniques other than the encoder 110 to further minimize reconstruction error. In such implementations, during compression, the compressed representation of the blocks of the video data 105 can be generated using the other techniques and the encoder 110 can determine the identifier of encoder expert model and include the identifier into the bit stream. The decoder 110 after receiving the compressed blocks and the corresponding identifier from the bit stream can then use the corresponding decoder expert model identified by the identifier to reconstruct the blocks of the video data 110.

Figure 3:
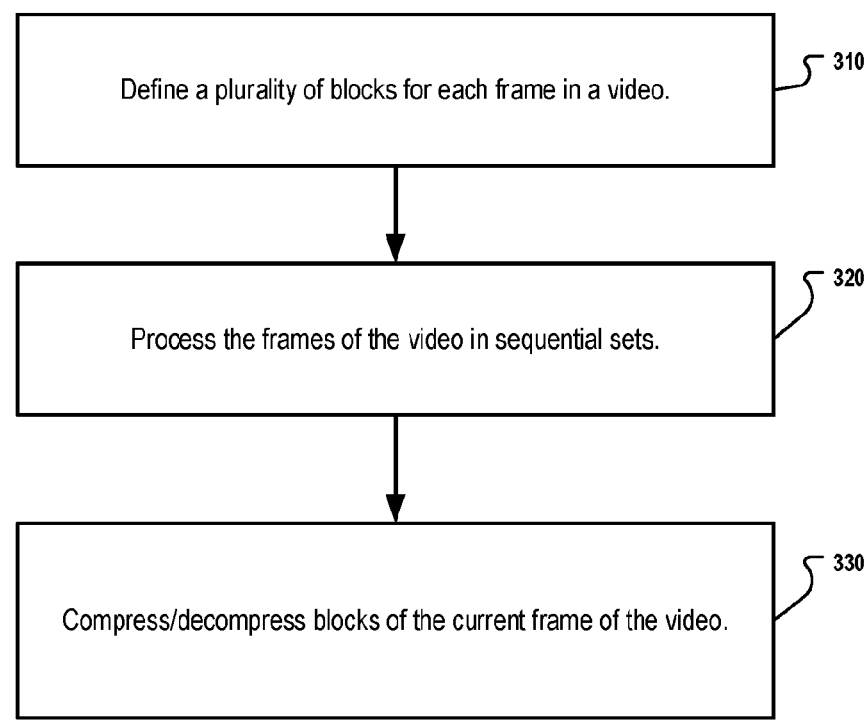
FIG. 3 is a flow diagram of an example process for compressing/decompressing video.

FIG. 3 is a flow diagram of an example process of compressing and decompressing the blocks using inter and intra prediction techniques. For convenience, the process 300 will be described as being performed by a system of one or more computers located in one or more locations. For example, the encoder 110 and the decoder 160 with reference to FIG. 1, appropriately programmed in accordance with this specification, can perform the process 300.

The encoder frame processing apparatus defines a plurality of blocks for each frame in a video (310). For example, the encoder frame processing apparatus 115 can process each frame of the video data 105 and define for each frame, multiple blocks that make up each of those frames. For example, assume that a video data 105 includes frames of dimension 150×150 pixels and the encoder frame processing apparatus 115 defines blocks of dimension 10×10 pixels. In this example, the encoder frame processing apparatus 115 can define each frame of the video data using 15*15=225 blocks.

The encoder and the decoder processes frames of the video in sequential sets (320). The video data can include multiple frames (also referred to as images) in sequence. For example, a video data corresponding to a video clip of duration 10 seconds at the rate of 25 frames per second (FPS) will include 10*25=250 frames in sequence. During compression and decompression, the encoder 110 and the decoder 160 processes a sequential set of frames. For example, while compressing a current block of a current frame, the encoder 100 can process information from the current frame and the prior frame that form the sequential set. More specifically, the encoder 110 processes a first border and a second border of the current block of the current frame, a first border and a second border of the current block of the prior frame and the respective current block of the prior frame. Similarly, while decompressing the current block of the current frame, the decoder 150 processes a first border and a second border of the current block of the current frame, a first border and a second border of the current block of the prior frame and the respective current block of the prior frame and optionally the compressed representation of the current block.

The encoder and the decoder can compress and decompress blocks of the current frame of the video respectively (330). For example, the encoder 110 and the decoder 160 implements a MOE model that includes multiple encoder expert models (120-1 to 120-N) and the multiple decoder expert models (170-1 to 170-N) trained jointly to optimize using a rate-distortion objective function. During compression, each of the multiple encoder expert models (120-1 to 120-N) of the encoder 110 can separately process the encoder input vector of pixel values to generate a respective compressed representation of the current block of the current frame. The gating apparatus 125 can then select a compressed representation of the current block of the current frame as a final compressed representation from among the N different compressed representations generated by each of the N encoder expert models by generating as output an identifier (or an index) indicating a particular encoder expert model such that the compressed representation generated by the particular encoder expert model can be selected as the final compressed representation of the current block of the current frame.

The combiner apparatus 125 can combine the final representation and the identifier of the particular encoder expert model by concatenation, to generate a bit stream 150 before transmitting the bit stream to the decoder 160.

During decompression, the decoder gating apparatus 175 can process the identifier of the encoder expert model to select a decoder expert model for predicting the current block. The selected decoder expert model can process the decoder input vector of pixel values and optionally the final compressed representation of the current block to predict a current block of the current frame. To reconstruct the entire video data 105, the decoder 160 iterates multiple times to predict multiple blocks of the each frame in the sequence of frames of the bit stream 150.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method performed by a data processing apparatus, comprising:
    for each frame in a video that includes multiple frames in an order sequence, defining, in the frame, a plurality of blocks in the frame, where each block in the frame is a sub-portion of the frame;
    processing the frames of video in sequential sets, wherein each sequential set is at least a current frame of video and a prior frame of video in the ordered sequence;
    for each sequential set, predicting blocks in the current frame of the video, each respective prediction of a block in the frame of the video comprising providing, as input to a prediction model:
        a first border of a current block of the current frame of the video;
        a second border of a current block of the current frame of the video;
        a first border for a respective current block of the prior frame of the video;
        a second border for the respective current block of the prior frame of the video;
        the respective current block of the prior frame of the video; and
        predicting, by the prediction model and based on the input to the prediction model for the sequential set, at least a sub-portion of the current block of the current frame of video;
    generating multiple compressed representations of a same block of the current frame, wherein each given compressed representation among the multiple compressed representations is generated by a different encoder expert model among multiple encoder expert models; and
    selecting, by a gating apparatus, one multiple compressed representation from among the multiple compressed representations as a final compressed representation of the same block.

2. The computer-implemented method of claim 1, wherein:
    the prediction model comprises a mixture of experts (MOE) model that includes a plurality of prediction models;
    each sequential set is associated with a respective identifier specifying one of the plurality of prediction models; and
    the prediction model used to predict the current block of the current frame of video is selected based on the identifier included in the sequential set.

3. The computer-implemented method of claim 2, wherein the MOE model comprises neural network models.

4. The computer-implemented method of claim 3, wherein the input to the prediction model comprises pixel values that are flattened and concatenated.

5. The computer-implemented method of claim 2, wherein:
    the MOE model includes convolutional neural network layers; and
    further comprising, providing, as input to the prediction model, the respective current block of the prior frame of the video as a current block of the current frame of video as a basis for predicting the current block of the current frame of video.

6. The computer-implemented method of claim 1, wherein each first border and second border for a respective block defines a contiguous border.

7. The computer-implemented method of claim 1, wherein predicting, by the prediction model and based on the input to the prediction model for the sequential set, at least a sub-portion of the current block of the current frame of video comprises predicting an entirety of the current block of the current frame of video.

8. The computer-implemented method of claim 1, wherein predicting, by the prediction model and based on the input to the prediction model for the sequential set, at least a sub-portion of the current block of the current frame of video comprises an auto-regressive prediction of only the sub-portion of the current block.

9. A system comprising:
    a memory device; and
    one or more processors configured to interact with the memory device and configured to perform operations, including:
        for each frame in a video that includes multiple frames in an order sequence, defining, in the frame, a plurality of blocks in the frame, where each block in the frame is a sub-portion of the frame;

processing the frames of video in sequential sets, wherein each sequential set is at least a current frame of video and a prior frame of video in the ordered sequence;
for each sequential set, predicting blocks in the current frame of the video, each respective prediction of a block in the frame of the video comprising providing, as input to a prediction model:
a first border of a current block of the current frame of the video;
a second border of a current block of the current frame of the video;
a first border for a respective current block of the prior frame of the video;
a second border for the respective current block of the prior frame of the video;
the respective current block of the prior frame of the video; and
predicting, by the prediction model and based on the input to the prediction model for the sequential set, at least a sub-portion of the current block of the current frame of video;
generating multiple compressed representations of a same block of the current frame, wherein each given compressed representation among the multiple compressed representations is generated by a different encoder expert model among multiple encoder expert models; and
selecting one multiple compressed representation from among the multiple compressed representations as a final compressed representation of the same block.

10. The system of claim 9, wherein:
the prediction model comprises a mixture of experts (MOE) model that includes a plurality of prediction models;
each sequential set is associated with a respective identifier specifying one of the plurality of prediction models; and
the prediction model used to predict the current block of the current frame of video is selected based on the identifier included in the sequential set.

11. The system of claim 10, wherein the MOE model comprises neural network models.

12. The system of claim 11, wherein the input to the prediction model comprises pixel values that are flattened and concatenated.

13. The system of claim 10, wherein:
the MOE model includes convolutional neural network layers; and
further comprising, providing, as input to the prediction model, the respective current block of the prior frame of the video as a current block of the current frame of video as a basis for predicting the current block of the current frame of video.

14. The system of claim 9, wherein each first border and second border for a respective block defines a contiguous border.

15. The system of claim 9, wherein predicting, by the prediction model and based on the input to the prediction model for the sequential set, at least a sub-portion of the current block of the current frame of video comprises predicting an entirety of the current block of the current frame of video.

16. The system of claim 9, wherein predicting, by the prediction model and based on the input to the prediction model for the sequential set, at least a sub-portion of the current block of the current frame of video comprises an auto-regressive prediction of only the sub-portion of the current block.

17. A non-transitory computer readable medium storing instructions that, when executed by one or more data processing apparatus, cause the one or more data processing apparatus to perform operations comprising:
for each frame in a video that includes multiple frames in an order sequence, defining, in the frame, a plurality of blocks in the frame, where each block in the frame is a sub-portion of the frame;
processing the frames of video in sequential sets, wherein each sequential set is at least a current frame of video and a prior frame of video in the ordered sequence;
for each sequential set, predicting blocks in the current frame of the video, each respective prediction of a block in the frame of the video comprising providing, as input to a prediction model:
a first border of a current block of the current frame of the video;
a second border of a current block of the current frame of the video;
a first border for a respective current block of the prior frame of the video;
a second border for the respective current block of the prior frame of the video;
the respective current block of the prior frame of the video; and
predicting, by the prediction model and based on the input to the prediction model for the sequential set, at least a sub-portion of the current block of the current frame of video;
generating multiple compressed representations of a same block of the current frame, wherein each given compressed representation among the multiple compressed representations is generated by a different encoder expert model among multiple encoder expert models; and
selecting one multiple compressed representation from among the multiple compressed representations as a final compressed representation of the same block.

18. The non-transitory computer readable medium of claim 17, wherein:
the prediction model comprises a mixture of experts (MOE) model that includes a plurality of prediction models;
each sequential set is associated with a respective identifier specifying one of the plurality of prediction models; and
the prediction model used to predict the current block of the current frame of video is selected based on the identifier included in the sequential set.

19. The non-transitory computer readable medium of claim 18, wherein the MOE model comprises neural network models.

20. The non-transitory computer readable medium of claim 18, wherein:
the MOE model includes convolutional neural network layers; and
further comprising, providing, as input to the prediction model, the respective current block of the prior frame of the video as a current block of the current frame of video as a basis for predicting the current block of the current frame of video.

* * * * *